(12) United States Patent
Feigl

(10) Patent No.: US 9,790,918 B2
(45) Date of Patent: Oct. 17, 2017

(54) WIND TURBINE BLADE CONNECTOR ASSEMBLY

(75) Inventor: Luca Feigl, Barcelona (ES)

(73) Assignee: ALSTOM Renewable Technologies, Grenoble (FR)

( * ) Notice: Subject to any disclaimer, the term of this patent is extended or adjusted under 35 U.S.C. 154(b) by 840 days.

(21) Appl. No.: 14/233,139

(22) PCT Filed: Jul. 26, 2012

(86) PCT No.: PCT/EP2012/064679
§ 371 (c)(1),
(2), (4) Date: Jan. 15, 2014

(87) PCT Pub. No.: WO2013/014228
PCT Pub. Date: Jan. 31, 2013

(65) Prior Publication Data
US 2014/0140853 A1 May 22, 2014

Related U.S. Application Data

(60) Provisional application No. 61/539,739, filed on Sep. 27, 2011.

(30) Foreign Application Priority Data

Jul. 27, 2011 (EP) ..................................... 11382258

(51) Int. Cl.
*F03D 1/06* (2006.01)

(52) U.S. Cl.
CPC ......... *F03D 1/0658* (2013.01); *F03D 1/0675* (2013.01); *F05B 2250/13* (2013.01); *F05B 2260/301* (2013.01); *Y02E 10/721* (2013.01)

(58) Field of Classification Search
CPC ........ F05B 2260/301; F05B 2280/6013; F05B 2260/13; F03D 1/0658; F03D 1/0657;
(Continued)

(56) References Cited

U.S. PATENT DOCUMENTS 4,915,590 A 4/1990 Eckland et al.
6,371,730 B1 * 4/2002 Wobben ................ F03D 1/0658
416/204 R
(Continued)

FOREIGN PATENT DOCUMENTS

DE 19733372 1/1999
WO WO 03/057457 7/2003
(Continued)

OTHER PUBLICATIONS

International Search Report for PCT/EP2012/064679, dated Sep. 12, 2012, 11 pgs.

*Primary Examiner* — Woody Lee, Jr.
*Assistant Examiner* — Joshua R Beebe
(74) *Attorney, Agent, or Firm* — Dority & Manning, P.A.

(57) ABSTRACT

It comprises bushings in at least a first circumferential row in a blade portion and suitable for receiving studs in a hub portion. Bushings comprise an elongated body with lateral faces, lateral faces inclined to each other and major and minor faces into which the lateral faces converge. The connector assembly allows an efficient releasable connection of blade root and hub in a wind turbine rotor.

10 Claims, 3 Drawing Sheets

(58) Field of Classification Search
 CPC . F03D 1/001; F03D 1/065; F03D 1/06; Y02E 10/721
 See application file for complete search history.

(56) References Cited

U.S. PATENT DOCUMENTS

| | | | | |
|---|---|---|---|---|
| 8,186,960 | B2* | 5/2012 | Dawson | B23P 6/00 416/204 R |
| 2007/0065288 | A1* | 3/2007 | Sorensen | B29C 70/86 416/222 |
| 2007/0154317 | A1* | 7/2007 | Cairo | F03D 1/0658 416/230 |
| 2008/0206059 | A1* | 8/2008 | Hancock | F03D 1/0658 416/213 R |
| 2008/0240922 | A1* | 10/2008 | Eusterbarkey | F03D 80/00 416/204 R |
| 2009/0246446 | A1* | 10/2009 | Backhouse | F01D 5/147 428/76 |
| 2010/0158661 | A1* | 6/2010 | Dawson | B23P 6/00 415/4.3 |
| 2012/0045339 | A1* | 2/2012 | Fleming | F01D 5/30 416/212 R |
| 2014/0030094 | A1* | 1/2014 | Dahl | B29C 70/885 416/217 |

FOREIGN PATENT DOCUMENTS

| | | |
|---|---|---|
| WO | WO 2006/070171 | 7/2006 |
| WO | WO 2009/132612 | 11/2009 |
| WO | WO 2011/035548 | 3/2011 |
| WO | WO 2011/044750 | 4/2011 |

* cited by examiner

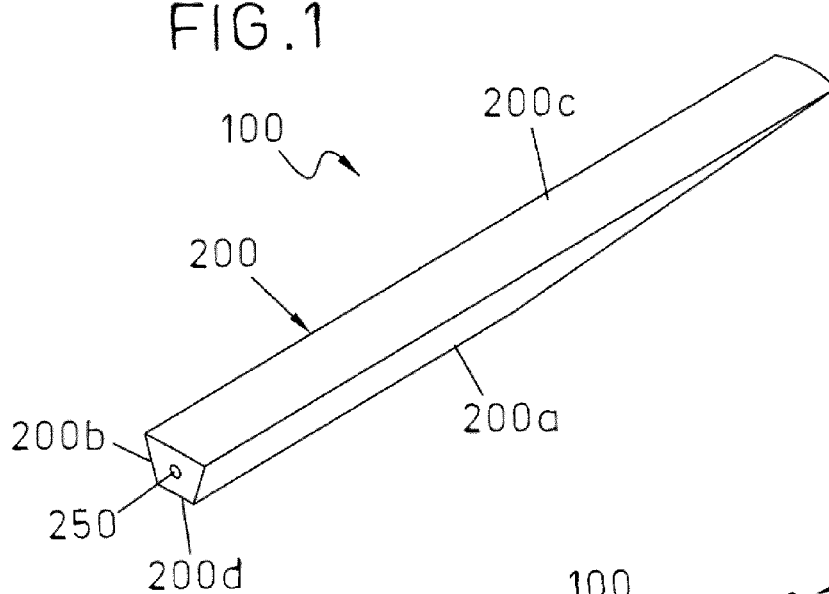
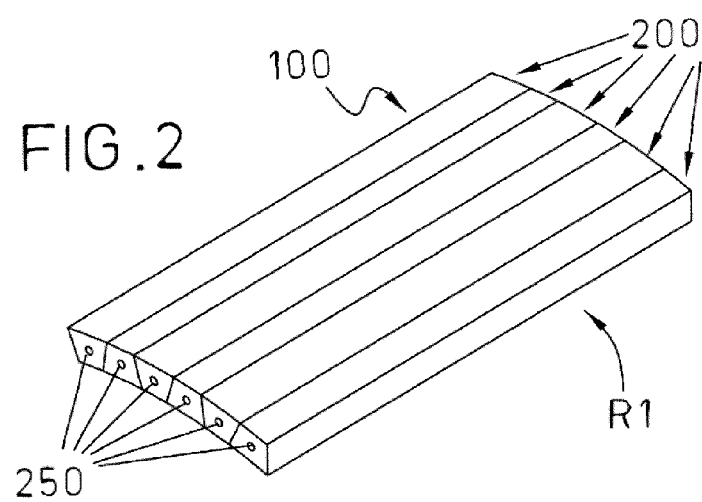
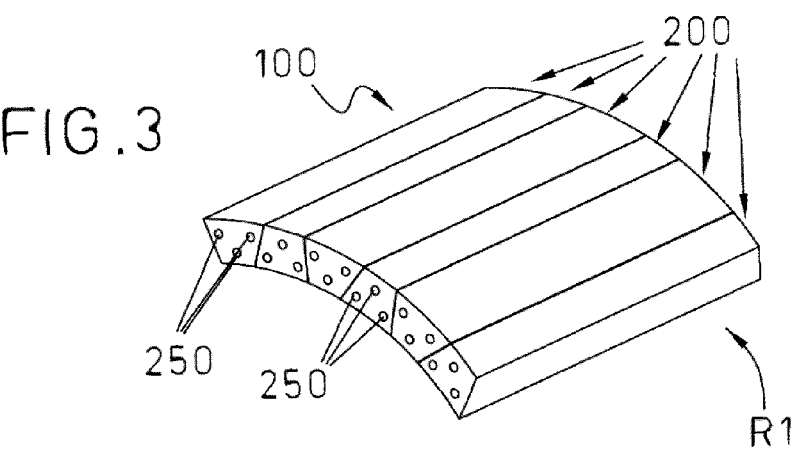

WIND TURBINE BLADE CONNECTOR ASSEMBLY

TECHNICAL FIELD

The present disclosure relates to a wind turbine blade connector assembly for connecting a blade portion to a hub portion in a wind turbine rotor.

The present disclosure further relates to a wind turbine and a method for connecting a blade portion to a hub portion in a wind turbine rotor.

BACKGROUND

Wind turbine blades are connected to wind turbine low speed shaft through a rotor hub. The rotor hub is rigidly attached to the wind turbine low speed shaft so that they rotate together when the wind turbine is in use.

Blade connector assemblies are known in the art for releasable attachment of the blades to the rotor hub in a wind turbine. Known blade connector assemblies typically comprise a number of bushings having internal threads. Bushings are usually arranged in at least one circular row or ring structure that is embedded into a blade portion such as the blade root. The bushings are therefore distributed along a circumference of the surface of said blade portion.

Bushings are adapted for threadably receiving corresponding threaded bolts or studs which, in turn, are attached to a portion of the rotor hub. This allows releasable securing of the blade to the hub.

U.S. Pat. No. 4,915,590 discloses one example of blade connector assembly. A multiplicity of rods is embedded around the periphery of the blade root parallel to the axis of the blade. During a bonding process, a substantial length of the rod is coated with a releasing agent to prevent it from bonding to the blade root except at the securement end out toward the formed blade portion. This solution involves time consuming bushing embedding operations as they entail accurate positioning of the multiplicity of rods.

It is also known to manufacture the blades for a wind turbine in one or more moulds in a way that the blades have integrally moulded bushings for attachment to the hub. In this respect, solutions are known consisting in providing an entire ring or ring segments of bushings integrated in the blade.

Document US2007065288 teaches a blade connection assembly comprising bushings that are bonded to the wind turbine blade root. The bushings have internal threads for mounting studs for releasable attachment of the blade root to the hub. The blade root is made of two parts that are assembled after hardening. At least one layer of fibre mat is placed in a mould and a foam holder is placed on the fibre mat. The holder has spaced recesses for accommodation of the bushings. At least one first layer of fibre mat is provided covering the recesses before placing the bushings. The outer side of the holder is provided with an adhesive and a shell laminate. Fibre glass strips are arranged between the bushings to extend in the longitudinal direction of the blade.

The main disadvantage of this blade connector assembly is that the fibre-bushing interface has a reduced contact of the metal cylindrical surface of the bushing to the fibres. In this case, for providing a greater fiber-bushing contact the bushings should be slightly roughened or with protrusions on the external surfaces such as barbs or flanges. This undesirably increases the costs of the blade connector assembly and therefore the overall costs of the installation.

Document WO03057457 discloses a wind turbine blade connector assembly for connecting a blade portion to a hub portion in a wind turbine rotor. The connector assembly comprises a number of bushings arranged in at least a first row along a circumference and suitable for receiving corresponding studs. Each bushing is in the form of a wedge shaped elongated body with first and second end portions, substantially planar upper and lower parallel faces and concave and convex cylindrical lateral faces. Several bushings may be arranged in parallel to allow the convex lateral faces to engage the concave lateral faces and such that the longitudinal axes of the elements extend in parallel along a curve in a plane perpendicular to the longitudinal axes of the embedding elements.

The curved lateral faces provided in this solution are required since the bushings are made of the same composite material as the blade. This results in a lower rigidity of the blade connector assembly. Otherwise, the geometry of the bushings in this solution with curved faces would be difficult and expensive to machine if they were made of metal.

In addition, it has been found that a critical point in a wind turbine blade connector assembly is the interface surface between the blade laminate and the ring structure of bushings. The above solution has the disadvantage that the concave and convex lateral faces are in close contact to each other and therefore no fibres can be provided between the bushings. This results in a poor load transfer between the bushings and root blade.

SUMMARY

The present disclosure provides a wind turbine blade connector assembly for connecting a blade portion to a hub portion in a wind turbine rotor by means of which the above disadvantages can be at least reduced.

The present disclosure therefore relates to a connector assembly comprising a number of bushings that are arranged in at least a first row along a circumference.

The term bushing, or insert, as used hereinafter shall refer to elongated pieces or bodies in general that are made of metal. Such elongated pieces or bodies are suitable, that is, sized and shaped, for receiving corresponding bolts or studs.

The elongated pieces or bodies of the bushings are provided with internal holes having internal threads for threadably receiving corresponding threaded bolts or studs. Within this context, the elongated body of at least some of the bushings may be solid or it may be hollow, that is, formed of bent metal plates.

According to this disclosure, at least some of the bushings comprise an elongated body having two lateral faces extending at least partially into at least one of the blade portion and the hub portion. The lateral faces of the bushings are inclined to each other and converging into respective major and minor faces. This results in that the body of at least some of the bushings are shaped substantially in the form of a trapezoidal prism. In at least some of the bushings, the trapezoidal prism shape could have at least one of the major and minor faces tapering towards one end of the bushing.

Bushings are therefore provided in the form of a prism with a substantially trapezoidal shaped cross section. However, in some embodiments, this trapezoidal geometry could have rounded edges to the extent of becoming bell shaped. Other equivalent shapes are not ruled out such as substantially triangular shaped cross-sections. In general, smooth rounded surfaces for the bushings are preferred in order to reduce stress concentrations.

The particular geometry of the bushings according to the present solution allows the manufacturing costs to be significantly reduced since the bushings are easy to be manufactured and machined if necessary (inclined surfaces are easier to machine than curved surfaces). The bushings can be therefore made of metal and therefore rigidity can be advantageously increased over solutions known in the art. As a consequence of the substantially triangular shape of the bushing cross-section they have greater inertia. Therefore, the blade connection works better, especially under radial forces.

Furthermore, the influence of the general geometry of the bushing with regard to pull-out resistance has been proven to be very important. Sharp edges have been shown to be not advantageous with regard to stress concentrations and may have and adverse effect on pull-out strength.

As a general rule, it is preferred that the cross-section of the body of at least some of the bushings in the blade connection assembly is substantially symmetrical about an axis passing through the centre of the blade portion corresponding to the plane containing said cross-section.

This particular geometry of the bushings in the present blade connection assembly provides an important advantage of adding stiffness to the blade root due to the larger contact surface of the bushings and the fibres in the blade root. This allows efficiently reducing ovalization problems, resulting in that circular parts could become oval due to structural distortion.

The particular geometry of the bushings as described allows that at least some of the bushings may be provided with a series of stud receiving holes suitable for threadably receiving a number of corresponding bolts or studs. A preferred number of holes is three. The feature that bushings are capable of receiving a plurality of studs allows longer blades to be mounted in the rotor hub without undesirably increasing the overall size, and therefore weight, of the rotor. This further allows costs to be significantly reduced.

The triangle like cross sectional shape of the body of the bushings allows a preferred bushing embodiment suitable for threadably receiving three studs arranged very close to each other. As compared with other geometries in prior art solutions, the distance between the centres of the stud receiving holes in a bushing is advantageously reduced. This therefore results in more compact bushings with a reduced general size. The height of the body of the bushing, that is, the distance between major and minor faces in a given point in the length of the bushing according to the present disclosure is significantly reduced. Therefore, in such a bushing arrangement, space is highly optimized thus making the provision of fibre mats easier.

In some embodiments, the bushings could be arranged in two rows, i.e. in a first row and a second row, along the circumference one of the blade portion or the hub portion. By having more than one row, that is, at least two bolt circles of different diameters, a larger total number of studs can be provided. This advantageously results in that suds with smaller diameters can be used and hence turbine costs can be therefore reduced.

The rows of bushings, that is, the circular structures of bushings, may comprise individual bushings or they may be formed of a single piece, for example a circular unitary structure formed of a multiplicity of bushings attached to each other.

The most preferred embodiment of the present blade connection assembly will therefore include a number of tapered metal bushings provided in two bolt circles (each formed with a series of segments) in which bushings of one bolt circle have complementary shapes to those of the other bolt circle. In other words, the bushings of the first row are arranged upside-down relative to the bushings of the second row and with the bushings of the first row being fitted between the bushings of the second row. In some cases, a space is defined between the bushings in the first row and the bushings in the second row a space in which fibres are arranged. This space for fibres is important for ensuring a proper load transfer.

The installation of the bushings in the present blade connection assembly is preferably carried out through the use of prepregs. Prepregs are uncured composite materials in which fibres have been preimpregnated with a pre-catalysed resin. The advantage is that the resin reacts very slowly at room temperature so they cure by heating them to a determined temperature. Through the use of a prepreg based process, the positioning of bushings is made easier than other known techniques such as infusion. This is because of the lower changes in bushing thickness. The impregnation of the body of the bushings is also made easier as the prepregs are already impregnated with resin.

The present disclosure further relates to a wind turbine. The present wind turbine comprises a rotor. The rotor includes a blade and a hub as well as the previously described blade connection assembly by means of which the blade and the hub can be connected to each other through respective blade and hub portions.

The present disclosure still further relates to a method for connecting a blade portion to a hub portion in a wind turbine rotor. The method makes use of the above mentioned blade connection assembly for the releasable connection of the blade and the hub.

More particularly, this method comprises at least providing a first layer of fibre materials, i.e. pre-impregnated fibre materials in a fibre mat, in a mould, providing a first layer of the previously disclosed bushings in the required positions on the first layer of fibre materials such that a space is defined between the bushings for accommodating fibre materials. A second layer of fibre materials is provided. Then the mould is heated up during a given period of time, and then cooled down during a given period of time.

The above method may further comprise providing a second layer of bushings and then a third layer of fibre materials. Likewise, the mould is then heated up during a given period of time, and subsequently cooled down during a given period of time.

Additional objects, advantages and features of embodiments will become apparent to those skilled in the art upon examination of the description, or may be learned by practice thereof.

BRIEF DESCRIPTION OF THE DRAWINGS

Particular embodiments will be described in the following by way of non-limiting examples, with reference to the appended drawings, in which:

FIG. 1 is a perspective view of one bushing that is part of a first embodiment of a blade connector assembly;

FIG. 2 is a perspective view of a partial ring structure formed of a series of bushings corresponding to a second embodiment of a blade connector assembly;

FIG. 3 is a perspective view of a partial ring structure formed of a series of bushings corresponding to a third embodiment of a blade connector assembly;

DETAILED DESCRIPTION OF EMBODIMENTS

Figure 4:
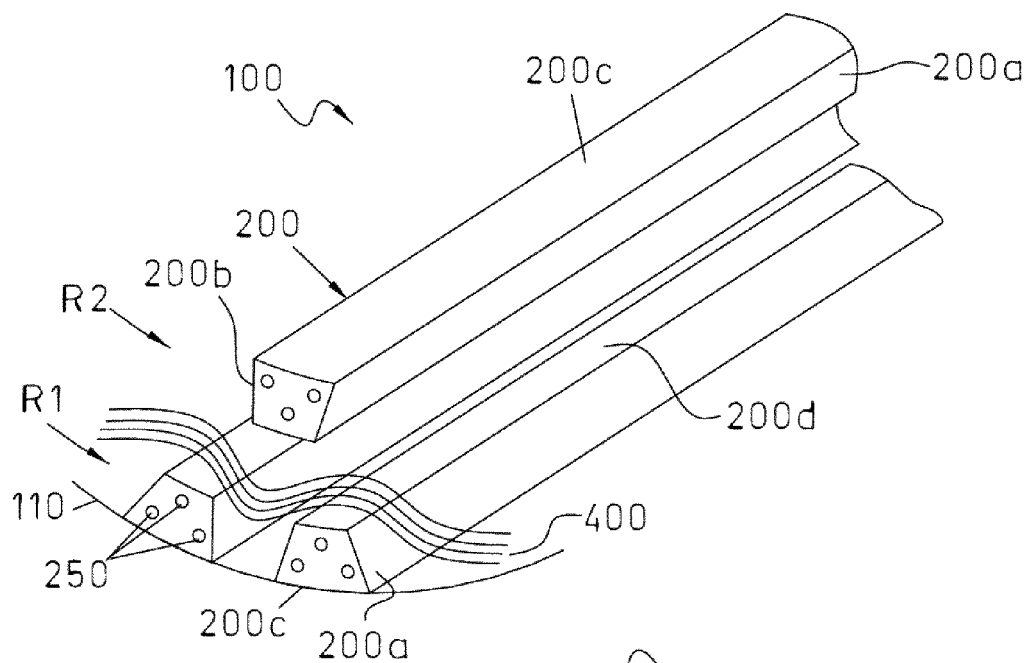
FIG. 4 is a perspective view of a partial ring structure of bushings corresponding to a fourth embodiment of a blade connector assembly.

The figures enclosed herein show four possible embodiments of the present blade connector assembly. Like reference numerals refer to like elements throughout the following description.

The blade connector assembly has been designated by reference numeral 100 in the drawings. The present blade connector assembly 100 is part of a wind turbine rotor. A typical wind turbine rotor includes a blade 105 (shown in general in FIG. 7) and a hub (not shown in the figures). The blade 105 and the hub can be releasably connected to each other through respective blade and hub portions by means of the present blade connector assembly 100 which will be disclosed fully below.

Figure 7:
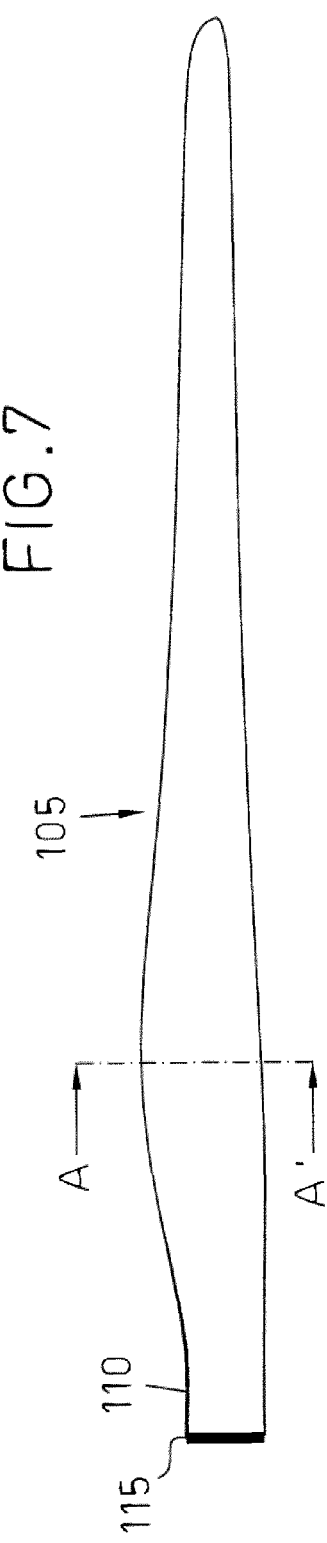
FIG. 7 is a side elevational view of a blade root.
Figure 8:
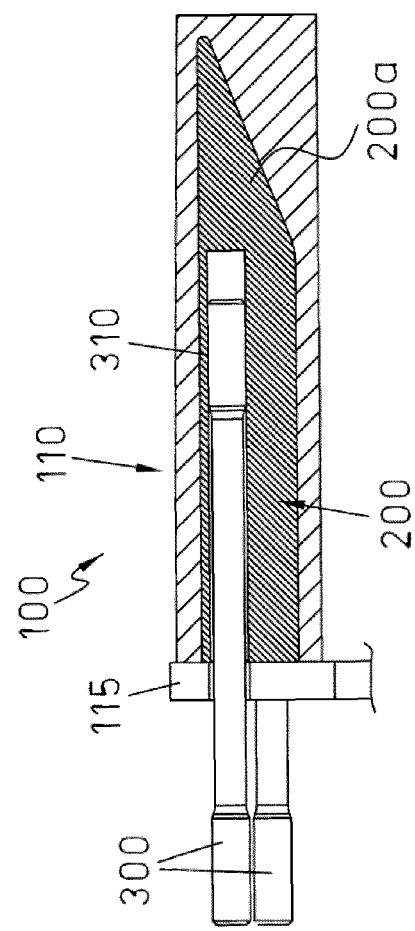
FIG. 8 is a longitudinal sectional view of one bushing according to the embodiment of the blade connector assembly in FIG. 3 taken along line AA' in FIG. 7.

In general, the blade and hub portions may be any suitable portions thereof for proper releasable connection. In the examples shown in the drawings, the blade portion is the blade root 110 and the hub portion is a portion in the outer end surface of the rotor hub. The blade root 110 may comprise a flange portion 115 as shown in FIGS. 7 and 8. Although not shown, the hub portion comprises a corresponding flange portion. Both flange portions form the interface of the blade—hub connection.

The blade connector assembly 100 comprises a number of bushings or inserts 200. As shown in the figures, the bushings 200 are elongated metal pieces. The bushings 200 are sized and shaped for receiving corresponding bolts or studs 300. Studs 300 are in turn attached to the hub portion. Two studs 300 are visible in FIG. 8.

As shown in the embodiments of FIGS. 2 and 3, the bushings 200 of the blade connector assembly 100 are arranged in one row or ring structure R1. The ring structure R1 may be a single structure or it may comprise a number of ring segments each having a number of bushings 200 that, when placed to one another, form a complete ring structure R1. FIGS. 2 and 3 diagrammatically show part of such a ring structure R1, that is, a ring segment.

As shown in FIG. 1, the elongated body of bushing 200 comprise two lateral faces 200a, 200b extending into the blade portion 110. As best shown in FIG. 8, each bushing 200 extends from the flange portion 115 into the blade root 110. The lateral faces 200a, 200b of bushings 200 are substantially inclined to each other and they converge into respective major and minor faces 200c, 200d as it can be clearly seen in FIG. 5.

Figure 5:
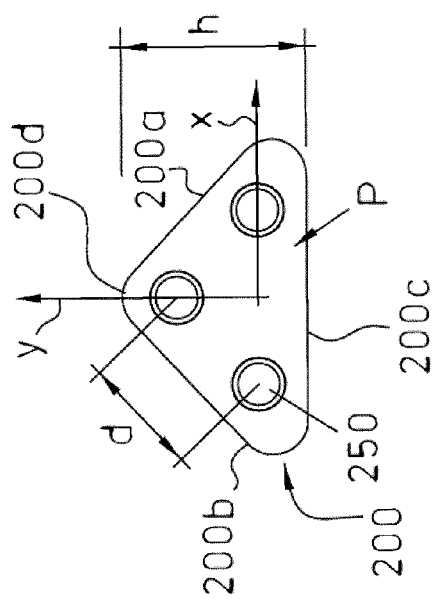
FIG. 5 is a front elevational view of one bushing of the embodiment of the blade connector assembly in FIG. 3.

The above configuration results in trapezoidal prism shaped bushings 200 as shown in FIGS. 1-5, that is, a prism having a substantially trapezoidal shaped cross section (see again FIG. 5 of the drawings). In general, the cross-section of the body of the bushings 200 is substantially symmetrical about an axis y passing through the centre C of the blade portion 110 corresponding to the plane P containing the cross-section of the bushing 200.

Figure 6:
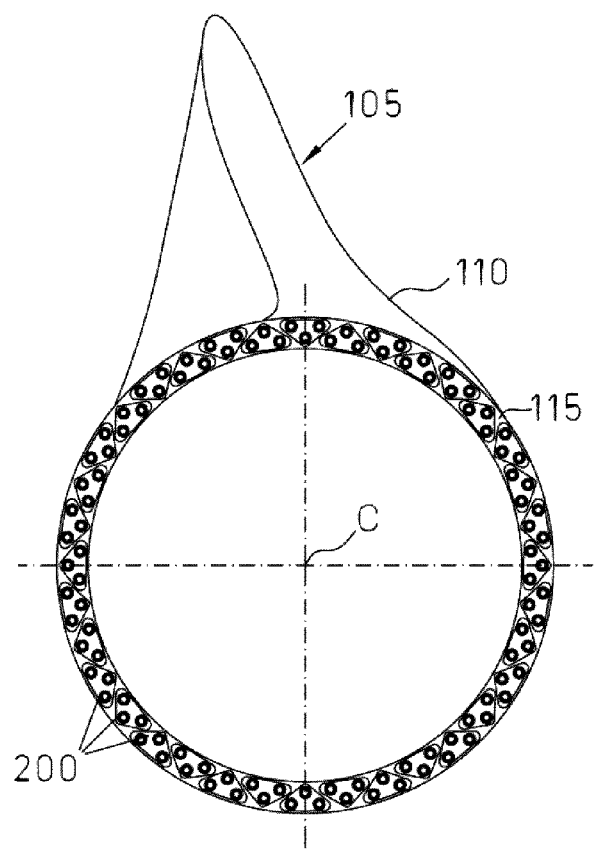
FIG. 6 is a front elevational view from a blade root side in which two ring structures of bushings are shown.

Although several triangle-like shapes are possible, the most preferred embodiment as shown in FIG. 5 is the one in which the cross-section of the bushing 200 is shaped in the form of an equilateral triangle. This results in that the bushings 200 are arranged along the circumference of the blade root 110 in two bolt circles R1, R2 as it will explained further below. In this arrangement, the bushings 200 are placed to each other such that the corresponding confronting faces of adjacent bushings 200 are substantially parallel to each other. Other arrangements are of course possible, such as the one on which the bushings 200 are shaped in cross-section in a form other than an equilateral triangle such that they become arranged with the corresponding confronting faces of adjacent bushings 200 not parallel to each other as shown in FIG. 6.

In the particular embodiment shown in FIGS. 1 and 8, the elongated body of the bushing 200 tapers towards one end of the blade root 110. As specifically shown in FIG. 5, the trapezoidal body of the bushing 200 has rounded edges for the purposes of reducing stress concentrations.

The bushings 200 are provided with stud receiving holes 250. In the embodiments of FIGS. 1 and 2, the bushings 200 are each provided with one stud receiving hole 250, while in the embodiments of FIGS. 3-8, the bushings 200 are each provided with three stud receiving holes 250.

Holes 250 formed in the body of the bushings 200 have inner threads for threadably receiving the corresponding bolts or studs 300. To this effect, studs 300 are provided with corresponding threaded portions 310 as shown in FIG. 7.

In the embodiment in which several stud receiving holes 250 are provided, e.g. three, said holes 250 can be arranged very close to each other as shown in the cross-sectional view of FIG. 5. The distance d between the centres of each stud receiving holes 250 is significantly reduced due to the triangular shaped cross section of the body of the bushing 200. The small value of distance d allows the bushings 200 to be compact in size that is, with a reduced height h, i.e. having a short distance between major and minor faces 200c, 200d.

A further embodiment of the present blade connector assembly 100 is shown in FIG. 4. In this embodiment, the bushings 200 of the blade connector assembly 100 are arranged in two rows or ring structures R1, R2 along the circumference of the flange portion 115 in the blade root 110.

The provision of ring structures R1, R2 results in two bolt circles being provided having different diameters. As illustrated in FIG. 4, the bushings 200 of one ring structure R1 may have complementary shapes to those of the other ring structure R2, that is, the bushings 200 of one ring structure R1 are arranged upside-down relative to the bushings 200 of the other ring structure R2 and fitted ones between others as shown in FIG. 4. As stated above, rings R1, R2 may each be formed of a single structure or they may comprise a number of segments each having a number of bushings 200 defining complete ring structures R1, R2.

In the arrangement shown in FIG. 4, the bushings 200 in different rows R1, R2 define a space between which fibre material such as prepreg fibres 400 is arranged. The prepreg fibres 400 allow an easier positioning of bushings 200 due to lower changes in bushing thickness during blade connection manufacturing process.

The blade—hub connection can be carried out by providing a first layer of prepreg fibres 400 into a mould and then placing a first row R1 of bushings 200 thereon according to required positions. A second layer of prepreg fibres 400 is then placed such as shown in FIG. 4 of the drawings. A second row R2 of bushings 200 are subsequently placed on the second layer of prepreg fibres 400 such that shapes of bushings 200 in different rows R1, R2 are complimentary and defining said space between the rows R1, R2 of bushings 200 for the fibres 400. Finally, a third layer of prepreg fibres 400 is provided on the second row R2 of bushings 200. The mould and therefore the resulting structure are heated up during a given period of time. The mould and therefore the resulting structure is thereafter cooled down during a given period of time.

Although only a number of particular embodiments and examples of the present connector assembly have been disclosed herein, it will be understood by those skilled in the art that other alternative embodiments and/or uses and obvious modifications and equivalents thereof are possible. Furthermore, the present disclosure covers all possible combinations of the particular embodiments described.

Reference signs related to drawings and placed in parentheses in a claim, are solely for attempting to increase the intelligibility of the claim, and shall not be construed as limiting the scope of the claim. Thus, the scope of the present disclosure should not be limited by particular embodiments, but should be determined only by a fair reading of the claims that follow.

The invention claimed is:

1. A wind turbine blade connector assembly for connecting a blade portion to a hub portion in a wind turbine rotor, the connector assembly comprising:

a plurality of bushings arranged in a first row and in a second row along a circumference of one of the blade portion or the hub portion and suitable for receiving corresponding studs, wherein the bushings comprise an elongated body having major and minor faces and two lateral faces, the lateral faces extending at least partially into one of the blade portion or the hub portion, and the lateral faces being inclined to each other and converging into the respective major and minor faces, the bushings in the first row arranged upside-down relative to the bushings in the second row and between the bushings in the second row such that the major faces of the bushings in the first row alternate with the minor faces of the bushings in the second row;

the body of each bushing configured for receipt of a triangular pattern of three studs, wherein a first stud is adjacent the minor face and second and third studs are spaced apart and adjacent the major face; and wherein the plurality of bushings thereby provide an outer ring of the studs and a concentric inner ring of the studs interspaced between the outer ring of studs.

2. The connector assembly of claim 1, wherein the body of at least some of the bushings has a substantially trapezoidal shaped cross-section.

3. The connector assembly of claim 1, wherein the body of at least some of the bushings has rounded edges.

4. The connector assembly of claim 3, wherein the body of at least some of the bushings is bell shaped.

5. The connector assembly of claim 1, wherein a cross-section of the body of at least some of the bushings is symmetrical about an axis passing through a centre of the blade portion corresponding to the plane containing the cross-section.

6. The connector assembly of claim 1, wherein at least one of the major and minor faces of the body of at least some of the bushings tapers towards one end of the bushing.

7. The connector assembly of claim 1, wherein the body of the bushings are configured for threadably receiving the studs.

8. A wind turbine comprising a rotor including a blade and a hub, the blade and the hub being connected to each other by means of the blade connector assembly of claim 1.

9. A method for connecting a blade portion to a hub portion in a wind turbine rotor, the method comprising at least the following steps:

providing a first layer of fibre materials in a mould;

providing a first row of bushings on the first layer of fibre materials along a circumference, the bushings comprising an elongated body having major and minor faces and two lateral faces and configured for receipt of three studs in a triangular pattern wherein a first stud is adjacent the minor face and second and third studs are spaced apart and adjacent the major face, the lateral faces inclined to each other and converging into the respective major and minor faces;

providing a second layer of fibre materials over the first row of bushings;

providing a second row of the bushings on the second layer of fibre materials arranged upside-down relative to and between the first row of bushings row such that the major faces of the bushings in the first row alternate with the minor faces of the bushings in the second row;

providing a third layer of fibre materials over the second row of bushings;

heating the mould during a given period of time;

cooling the mould during a given period of time; and wherein the plurality of bushings thereby provide an outer ring of the studs and a concentric inner ring of the studs interspaced between the outer ring of studs.

10. The method of claim 9, wherein the fibre materials are pre-impregnated fibre materials.

* * * * *